United States Patent [19]

Zatezalo et al.

[11] Patent Number: 5,115,406

[45] Date of Patent: May 19, 1992

[54] ROTATING MACHINERY DIAGNOSTIC SYSTEM

[75] Inventors: John M. Zatezalo; Michael S. Panson, both of Pittsburgh, Pa.

[73] Assignee: Gateshead Manufacturing Corporation, McMurray, Pa.

[21] Appl. No.: 593,699

[22] Filed: Oct. 5, 1990

[51] Int. Cl.$^5$ ............................................. G06F 15/46
[52] U.S. Cl. ........................ 364/551.01; 364/709.11; 364/506
[58] Field of Search .............. 364/550, 551.01, 551.02, 364/580, 506, 507, , 500, 557, 709.11, 709.12, 709.15, 715.01; 235/462; 73/460, 462, 660

[56] References Cited

U.S. PATENT DOCUMENTS

| | | | |
|---|---|---|---|
| 3,975,058 | 10/1976 | Katz et al. | 235/156 |
| 3,976,975 | 8/1975 | Cochran | 340/172.5 |
| 3,979,057 | 10/1976 | Katz et al. | 235/156 |
| 4,060,719 | 11/1977 | Dalinowski | 364/729 |
| 4,081,859 | 3/1978 | Goldsamt | 364/709 |
| 4,218,755 | 8/1980 | Root | 364/900 |
| 4,234,924 | 11/1980 | La Vance et al. | 364/460 |
| 4,382,280 | 5/1983 | Mandel et al. | 364/412 |
| 4,453,407 | 6/1984 | Sato et al. | 364/508 |
| 4,463,438 | 7/1984 | Zatezalo et al. | 364/715 |
| 4,612,620 | 9/1986 | Davis et al. | 364/551.01 |
| 4,623,979 | 11/1986 | Zatezalo et al. | 364/715 |
| 4,807,162 | 2/1989 | Shibayama et al. | 364/507 |
| 4,817,003 | 3/1989 | Nagase et al. | 364/508 |
| 4,885,707 | 12/1989 | Nichol et al. | 364/551.01 |
| 4,977,516 | 12/1990 | Shepherd | 364/550 |
| 4,985,857 | 1/1991 | Bajpai et al. | 364/580 |

OTHER PUBLICATIONS

IRD Mechanalysis; Model 818 Machinery Maintenance Data Collector; Palomar Technology International.
Computerized Predictive Maintenance—A Spectral Approach; Schroff et al; Vibration Institute Seminar, Houston, Texas, Sep. 1986, pp. 167-176.
Durkin "Aligning Shafts Part I—Measuring Misalignment" *Plant Engineering*, Jan. 11, 1979, pp. 86-90.
Durkin "Aligning Shafts Part II—Correcting Misalignment", *Plant Engineering*, Feb. 8, 1979, pp. 102-105.

*Primary Examiner*—Parshotam L. Lall
*Assistant Examiner*—Michael L. Zanelli
*Attorney, Agent, or Firm*—Buchanan Ingersoll

[57] ABSTRACT

A diagnostic system for evaluating rotating machinery has a keyboard, a display of sufficient size to display messages and numbers, a face plate containing an illustration of rotating machinery having associated indicators to indicate the data to be entered, a processing unit, a memory and a memory card capable of receiving a programmable memory board and a preprogrammed memory board. The memory card enables the user to customize the system to take, store and analyze data and display messages particularly applicable to the user's business.

14 Claims, 8 Drawing Sheets

ROTATING MACHINERY DIAGNOSTIC SYSTEM

BACKGROUND OF THE INVENTION

The invention relates to a system for maintaining equipment which includes two machines having interconnected shafts which includes measuring alignment and bearing temperature and instructing the mechanic to perform needed maintenance.

FIELD OF THE INVENTION

Wherever two rotating shafts are coupled together it is important that their axis of rotation be the same. Misalignment of the shaft causes vibrations which cause excessive wear and even destruction of couplings, bearings, seals, gears and other components. Today, misalignment is the primary cause of more than 50 percent of all rotating machinery failures in many industries. Therefore, most owners of rotating machinery routinely inspect their equipment and make appropriate adjustments to correct misalignment.

There are well known equations which can be used to determine how to adjust the position of two coupled machines so that the interconnected shafts between them are properly aligned. To use the equations one must make certain measurements, insert those measurements in the equations and solve them. The solutions will tell the user how much and in what direction to move the machines so that their shafts will be properly aligned. Although these equations are well known they are seldom used. People in the field are unwilling to take the time to make the necessary measurements and solve the equations. Many are also uncomfortable in using the equations because they fear they will enter the wrong measurements or make other mistakes.

The result is that most alignments are now done by trial and error or visual inspection. The trial and error method is costly and time consuming. Through experience many people have developed a "feel" for proper alignment and rely upon that "feel" to do the job. However, misalignments of a few thousands of an inch cannot be seen, yet they can cause serious damage. Usually an alignment is considered to be proper when it in fact is not.

U.S. Pat. No. 4,436,438 discloses a calculator which will tell any mechanic how to align coupled machinery. Through a unique visual display the calculator tells the mechanic what measurements to make and in what order to make them. The mechanic simply enters those measurements in the sequence specified by the calculator and the device will tell him how much to shim the front and back feet of one of the coupled machines so that the coupled shafts will be properly aligned. Although this calculator represented a significant advance in the alignment field, it has several shortcomings. It cannot store information from several machines nor transmit information. All data must be manually entered. Users of the calculators of the prior art could only compensate for temperature changes and sag in measuring equipment by following detailed written instructions or using estimated conversion factors. There are no safeguards to assure that actual data was taken or entered. The calculator cannot provide customized instructions to the mechanic. The calculator cannot accept other information about the coupled machines such as bearing temperature or conditions, such as bearing noise, which are observed by the mechanic. Yet, that information is important to a preventive maintenance program.

BRIEF DESCRIPTION OF THE INVENTION

We provide a rotating equipment diagnostic system that overcomes the shortcomings of the calculator of U.S. Pat. No. 4,463,438. Our system includes a keyboard for entry of numerical data and observations about any rotating system. Like the calculator of the '438 patent, we provide a visual display which shows the technician what measurements to take and an LCD which display the data as it is entered and the results from the alignment method selected. Our system, however, is capable of receiving data electronically from optical sensors or electronic gauges or from an external computer or other source which contains information about the system. Additionally, our system can store information about any rotating machinery for later use.

We prefer to provide a memory card which enables the user to install a variety of memory containing customized programs and one or more databases. Such programs may allow the user to receive data from electronic sensors, give the user a route to follow in checking equipment, compare data taken at other times on the same machine, contain tolerances for the machines which are routinely inspected, or provide other data processing. Moreover, our calculator allows the user to input custom programs into the unit.

We also provide a two line, forty character LCD display which displays printed messages. These messages could be short commands requiring the user to enter data or notices that simply advise the mechanic who does the alignment about conditions of the machines or other useful information.

We also prefer to provide a bar code reader which permits users to place bar codes on their equipment and thereby identify each machine being examined.

The system is compact and easy to transport to and from the job site. It can operate on AC or battery power. Because it can be made from off the shelf components and employs printed circuitry it is durable and relatively inexpensive to produce.

Other details, objects and advantages of the invention will become apparent as a description of a present preferred embodiment of the invention proceeds.

BRIEF DESCRIPTION OF THE DRAWINGS

In the accompanying drawings, we have shown a present preferred embodiment of the invention in which.

Figure 1:
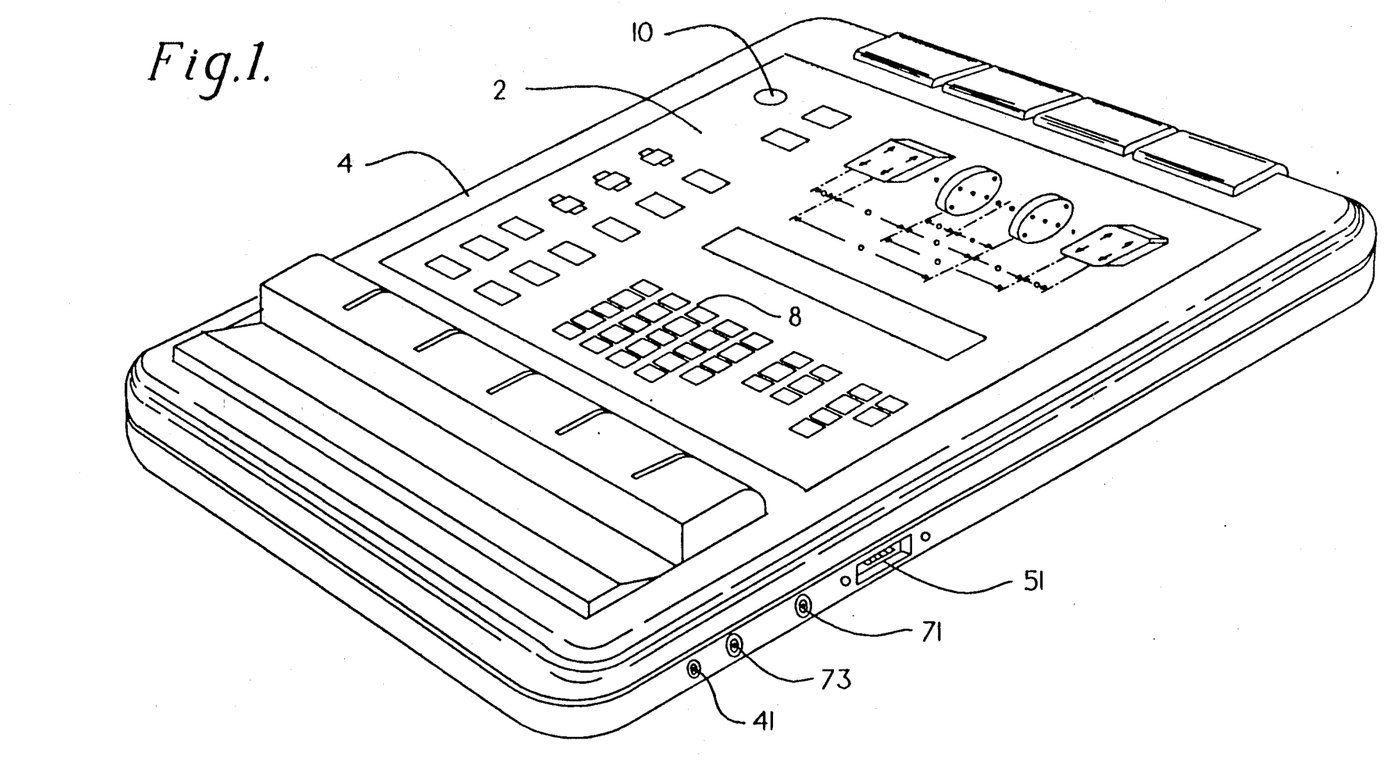
FIG. 1 is a perspective view of a present preferred embodiment of the invention.
Figure 2:
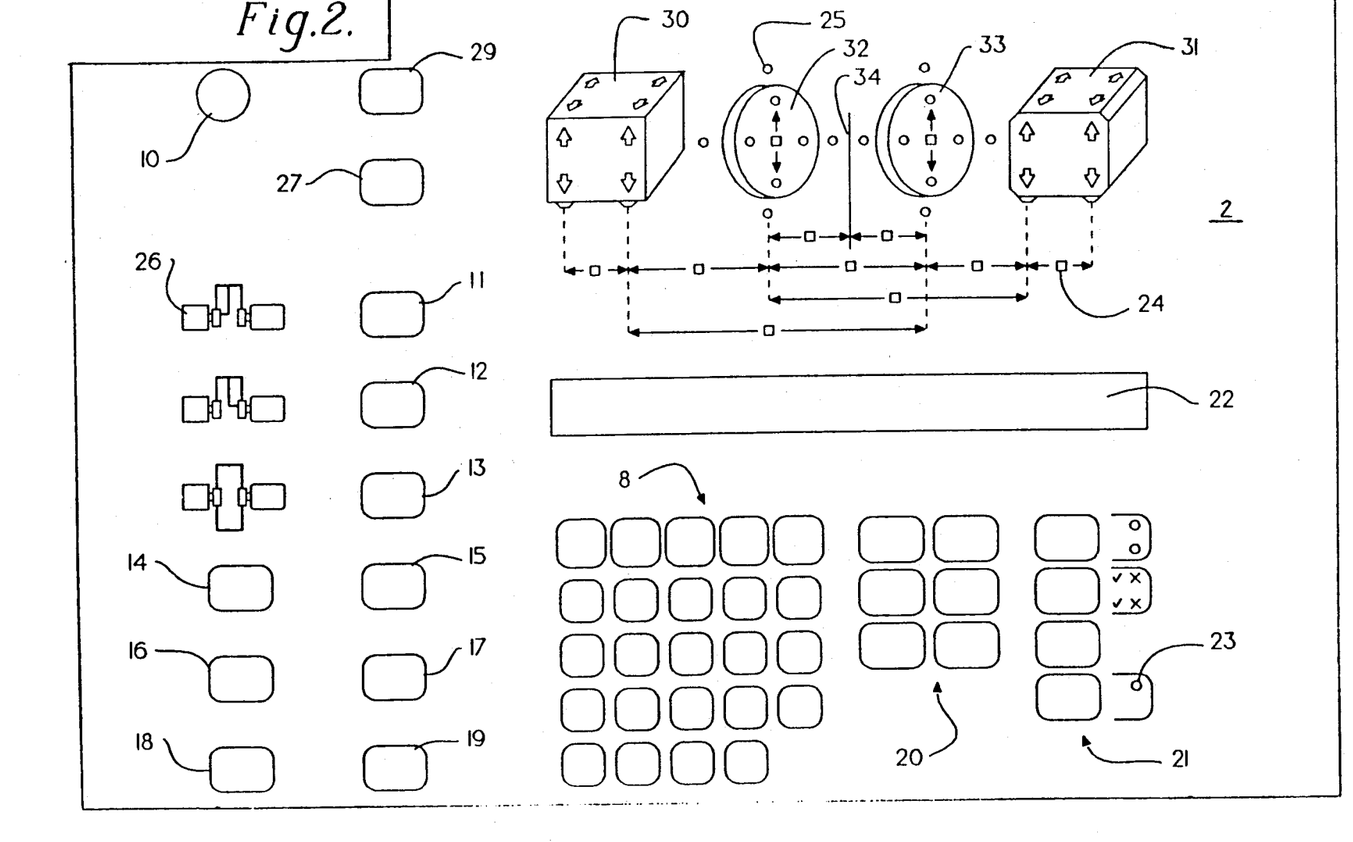
FIG. 2 is a top plan view of the face plate of the embodiment of FIG. 1.

Referring to FIGS. 1 and 2, the calculator is comprised of a face plate 2 fitted onto a housing 4 in which the circuitry is contained. The face of the device contains a data entry keyboard 8, power switch 10, method selection switches 11 thru 19, special function keys 20, alignment keys 21 and LCD display 22. A plurality of light emitting diodes are provided for identifying measurements to be taken which are in squares 24 and for identifying gauge readings to be taken which are in circles 25. Blocks 30 and 31 represent the coupled machines being examined. Arrows within those blocks illuminate to indicate a direction that the machine should be moved to align the coupled shafts. Discs 32 and 33 indicate coupling ends and line 34 is the coupling centerline. The diodes light in sequence to tell the user what data to enter. Because measurements are often made in eighths of an inch, I prefer to include keys for those fractions in the data entry keyboard 8 as shown. Our keyboard also permits entry of negative numbers by use of the minus "(−)" key. A question mark key enables the user to enter an unknown value which can be solved through equations contained in the memory.

We also prefer to store tolerances for each machine to be inspected. If the results of the measurements and calculations show a misalignment a diode below the or "√" "x" above keys 21 will illuminate to indicate that the alignment or offset is within our outside tolerable values. Our system is capable of receiving data electronically from optical measuring devices or electronic gauges which are connected to the calculator at ports 71 and 73. Also, we can use a bar code reader which plugs into port 41 to identify the equipment being examined and have data about each unit stored in memory. We also provide an RS232 port 51 to permit our unit to be connected to a remote computer to which data may be transferred for storage or analysis.

OPERATION OF THE INVENTION

To operate our calculator the user turns on the power with switch 10 and selects the method he intends to use with switches 11 thru 19. If he wishes to use the indicator reverse method (MI), he pushes key 11. An adjacent diagram 26 illustrates the gauge configuration for this method. We prefer to provide a segmented light board under the face plate to backlight the keys. This backlighting is activated by key 27. Then the mechanic enters measurements and readings in the sequence given by diodes 24 and 25. After all data has been entered the calculator will make the necessary calculation. Then the mechanic can read in display 22 the amount to shim or move the machine in the direction indicated by the arrows in boxes 30 and 31. The calculator will automatically store information until a new method key is pressed. Should the user want to keep the information for other purposes, he can do so by pushing the "Store" key 29.

To illustrate one operation of the invention in detail, suppose the mechanic has chosen the indicator reverse method (M3). First he will set his gauges as shown in diagram adjacent key 13. Then he presses the power switch 10 and key 13. LED's 4 and 25 will light in sequence to tell the mechanic to enter the appropriate distances and readings. To enter the data the mechanic presses the appropriate numerical keys on the keyboard and the entry is displayed on display 22. If the display is correct he presses the "Enter" key which enters the reading into the calculator's memory, clears the display and causes another LED to light calling for entry of the next reading. If the mechanic has typed the wrong numbers and the display is incorrect, he can clear the display with the "Clear" key and type in the correct figures. After all entries have been made, appropriate arrows in box 31 will light to tell the user the direction to move the machine to be shimmed (MTBS) to achieve a proper alignment. The distance to shim both the front foot and the back foot will appear automatically in display 22. To check any of the data entries one can use the recall (RCL) key which will recall the data entries in order. As each entry is recalled the appropriate LED's will light to indicate which measurement is being displayed.

To determine the required horizontal movement the mechanic depresses the vertical/horizontal (Vert. Hori.) key which sets the display at zero and causes LED 25 to light. Both planes are calculated simultaneously but displayed separately by pressing the vertical/horizontal key. In using this procedure the user normally will have to adjust his gauges to compensate for indicator sag caused by the bending of the mounting hardware. In our unit one can preprogram a notice which tells the mechanic what compensatory steps should be taken for a particular machine. The two indicator method works the same way as the indicator reverse method.

Should the machine to be shimmed have more than two support points the Intermediate Feet (Intm Feet) key enables one to determine how much to shim the intermediate feet. After answers have been obtained for the front and back feet the operator presses the intermediate feet key. Then LED 25 will light to signal that the distance from the front foot to the intermediate foot should be entered. After the operator enters that value arrows in box 30 or 31 will light and the amount by which the intermediate foot must be shimmed will appear in display 22.

If one discovers that the machine to be shimmed was resting on three rather than four feet the gauge readings will be inaccurate. The clear indicator (Clear Ind) key will clear the data which was entered for both gauge readings. Then the user can correct the "soft foot" condition, take new gauge readings and enter the new readings. The distance measurements will be retained by the calculator and need not be entered again.

Those skilled in the art will recognize that the procedures just described are substantially the same as the procedure used to operate the calculator of U.S. Pat. No. 4,463,438. The accuracy of the method of the '438 patent, however, is dependent upon the correctness of the data measured, read and entered by the mechanic. Such human error can be eliminated with the present calculator. That calculator cannot also retain or analyze data apart from solving the alignment equations.

We prefer to provide keys which allow the user to retain and monitor movements and soft foot conditions which occur over time. By pressing the "Monitor Moves" key the user will cause the calculator to retain the data determined for movement of the machine to be shimmed based upon the data then entered. This data can be transmitted to an external computer for analysis or compared to other data according to a program provided. If a pattern of movement appears this may indicate to the mechanic that a bearing problem is developing or another problem is occurring with the machine. Therefore, he will be able to take corrective measures before the machine fails. Those measures could be taken during the scheduled shut down of the machinery. Similarly, by pressing the "Monitor Soft Ft" key the user can tell the calculator that a softfoot condition exists and enter gauge readings before and after foot adjustments are made. From this data the calculator will tell the user how to shim the machine to correct the softfoot condition.

There are peculiar equipment configurations which may require special procedures to make an alignment. For example, it may not be possible because of equipment configuration to place indicator gauges or take measurements which are required for the alignment equations of methods 1, 2 and 3 indicated by keys 11 thru 13. In such circumstances, special technical applications can be programmed into the calculator to accommodate these particular circumstances. These technical applications can be called up by pressing the "Tech. Appl." key 17. Pressing that key activates a particular technical application program. That application may involve taking additional measurements. It may also involve specific written instructions which are displayed in liquid crystal display 22.

In many plants certain individuals are assigned to make regular inspections of plant equipment. These routes typically include a list of the equipment to be inspected. Each piece of equipment being identified by a number or location. With the present calculator, it is possible to provide a program which describes the route to be followed by the mechanic. By pushing the "Route" key the calculator will display in sequence the identification of the equipment to be inspected. As the data for each identified piece of equipment is collected and entered the calculator will record the time of the entry and the corrective measures indicated. This information can later be played out from the calculator to tell the manager or the maintenance engineer that the inspections had actually been done and provide the time of their inspections. Knowledge of the time at which inspections were made may prove useful in the event of equipment failure or in circumstances where current data appears to be inconsistent with previous data or expected data. The additional keys "Add Route" and "Skip Route" allow the user to include additional equipment identification to the list of routes or to skip a unit in the listed route.

During the inspection the mechanic may be asked to make certain observations such as whether an oil leak appears near the equipment or whether vibration is seen or heard. The "Enter Notes" key allows the user to inform his supervisor about the equipment and insert responses through the keyboard.

It is well known that temperature affects alignment. Therefore, misalignment indicated during a cold reading may not necessarily correspond to a misalignment when the equipment has been operating. Accordingly, we provide keys 14 and 15 to enable the user to record whether the equipment is hot or cold. If, for any particular equipment, alignment differences between cold conditions and hot conditions are significant, a program can be provided to accommodate those differences and enable an alignment to be made whether the system is hot or cold.

There are conditions when the normal alignment corrections cannot be followed. We provide keys 18 and 19 to allow the user to select an alternative method such as the compound move, key 19, which recalculates vertical adjustments in such a manner that both the machine to be shimmed (MTBS) and the stationary machine (SM) can be shimmed up to accomplish the vertical alignment when original answers indicate that the MTBS had to go down which movement proves to be difficult.

Key 18 enables us to recalculate necessary movements of what was originally identified as the stationary machine. Normally, the machine to be shimmed is considered to be on the right side. However, with our system the machine to be shimmed may be on the left.

It is very difficult in most situations to create a perfect alignment of coupled shafts. Nevertheless, a perfect alignment is not always required to produce acceptable bearing wear and equipment life. Accordingly, it is possible with our system to record tolerances for individual equipment. After the identification of the equipment has been entered, and appropriate measurements have been taken and recorded, our calculator will not only indicate the distances which the machine to be shimmed must be moved to place the shafts in alignment, but will also indicate whether that distance is within tolerances for the machine. This is done by pressing the vertical, horizontal alignment key (Vert. Hori.) or the angularity and offset (Angle Offset) key. Diodes under either the "check" or "x" next to the angularity and offset key will illuminate to indicate whether or not values calculated are within tolerance. If they are out of tolerance, the operator may proceed to realign the machine. When that is done he can enter the new gauge readings. Then the calculator will indicate whether the vertical alignment, horizontal alignment, angularity and offset of the coupled shafts are within tolerances.

As previously mentioned, the supervisor or plant engineer may want to have the user receive certain notices about particular equipment. With our calculator he can do that by recording the notice in memory. When the user enters an identification of the equipment and a notice has been recorded, a diode 23 adjacent the "Notices" key will illuminate. The user then presses the "Notices" key to acknowledge that he has read the notice in the liquid crystal display 22.

We prefer to program the calculator to round off all answers to the nearest one-tenth (i.e. 0.10 thousandths) because the thinnest shim stock available is 0.50 thousandths.

We also prefer to provide interlocks to prevent loss of data and incorrect entries. We further prefer to electronically bypass the "Clear" key when answers are in the display. Finally, the "Enter" key will cause data put in the display to be entered and progression to the next data entry to automatically occur. An interlock is provided so that subsequent depressing of the enter key will not cause progression or any data entry to occur unless new data has been put into the display. This interlock feature helps prevent omission of required data.

THE PREFERRED CIRCUITRY

Figure 3:
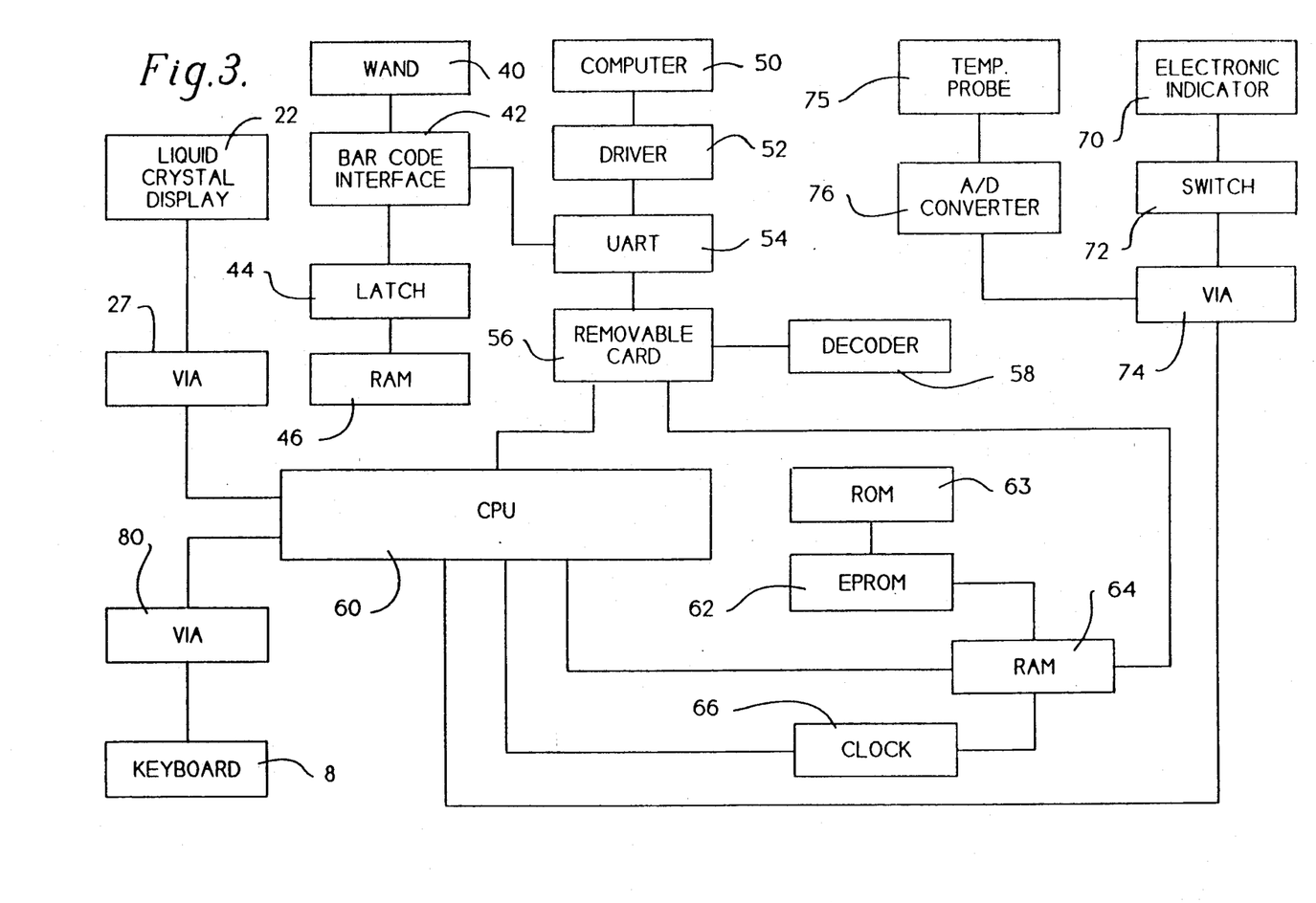
FIG. 3 is a block diagram of a present preferred embodiment of the invention.

FIG. 3 is a block diagram of the preferred circuitry of our invention which illustrates how current flows within th device. A detailed circuit diagram appears in FIGS. 4 thru 9. In this circuit, we prefer to use the components listed in Table I which also contains the reference number given each component in the drawings. Most components are available from a variety of sources by giving the listed part number. Therefore, sources are identified for only those parts which are not available from several manufacturers.

TABLE I

| Drawing Ref | Part No | Description |
|---|---|---|
| 27, 74, 80 | 65C22 | Rockwell versatile interface adaptor (VIA) |
| 42 | HBCR-2000/10 | Hewlett-Packert bar code interface |
| 44 | 74HC373 | Latch |
| 46 | 6116 | Static 2k × 8 RAM |
| 52 | MAX232 | Maxim driver |
| 54 | 65C52 | Rockwell UART chip |
| 55 | 74HC00 | Gate |
| 56 | DS 1217 series IC card | Dallas Semiconductor IC removable cards having a memory |
| 57 | 74HC4075 | Gate |
| 58 | 74HC237 | Decoder |
| 60 | 65C102 | Rockwell CPU |
| 61 | 74HC14 | Inverter Gate |
| 62 | 27C256 | 32K EPROM |
| 63 | | 16K ROM |
| 64 | 51256 | 32K RAM |
| 66 | RCT 12421 | Dallas Semiconductor Clock |
| 67 | 74HC139 | Decoder |
| 68 | 74HC137 | Decoder |
| 69 | 74HC08 | AND Gate |
| 72 | 74HC366 | Electronic switch |
| 73 | LCT 1092 | Maxim A/D converter |

Figure 4:
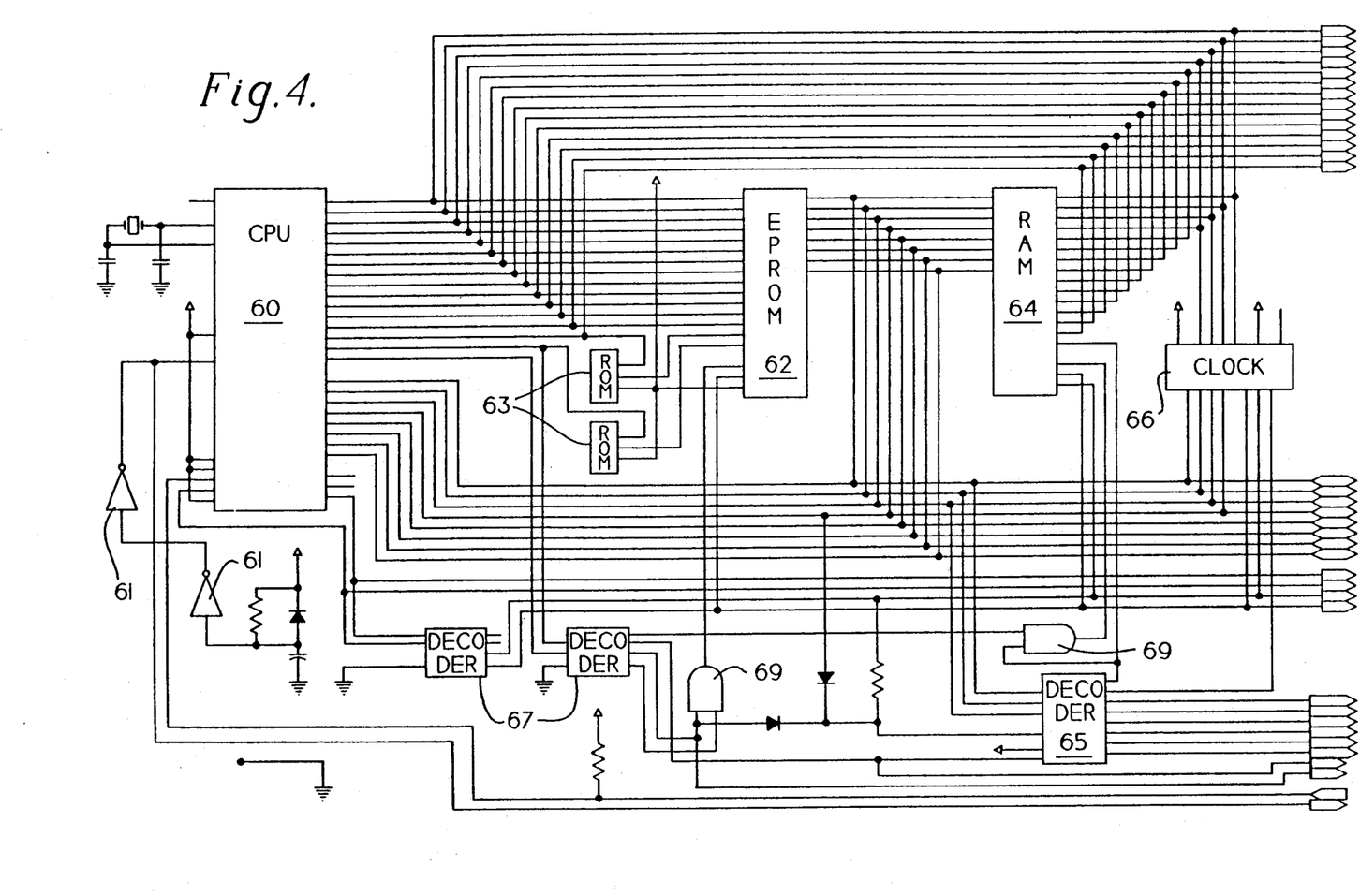
FIGS. 4 is a detailed circuit diagram of the processing and memory portion of the circuit of the embodiment of the FIG. 3.
Figure 5:
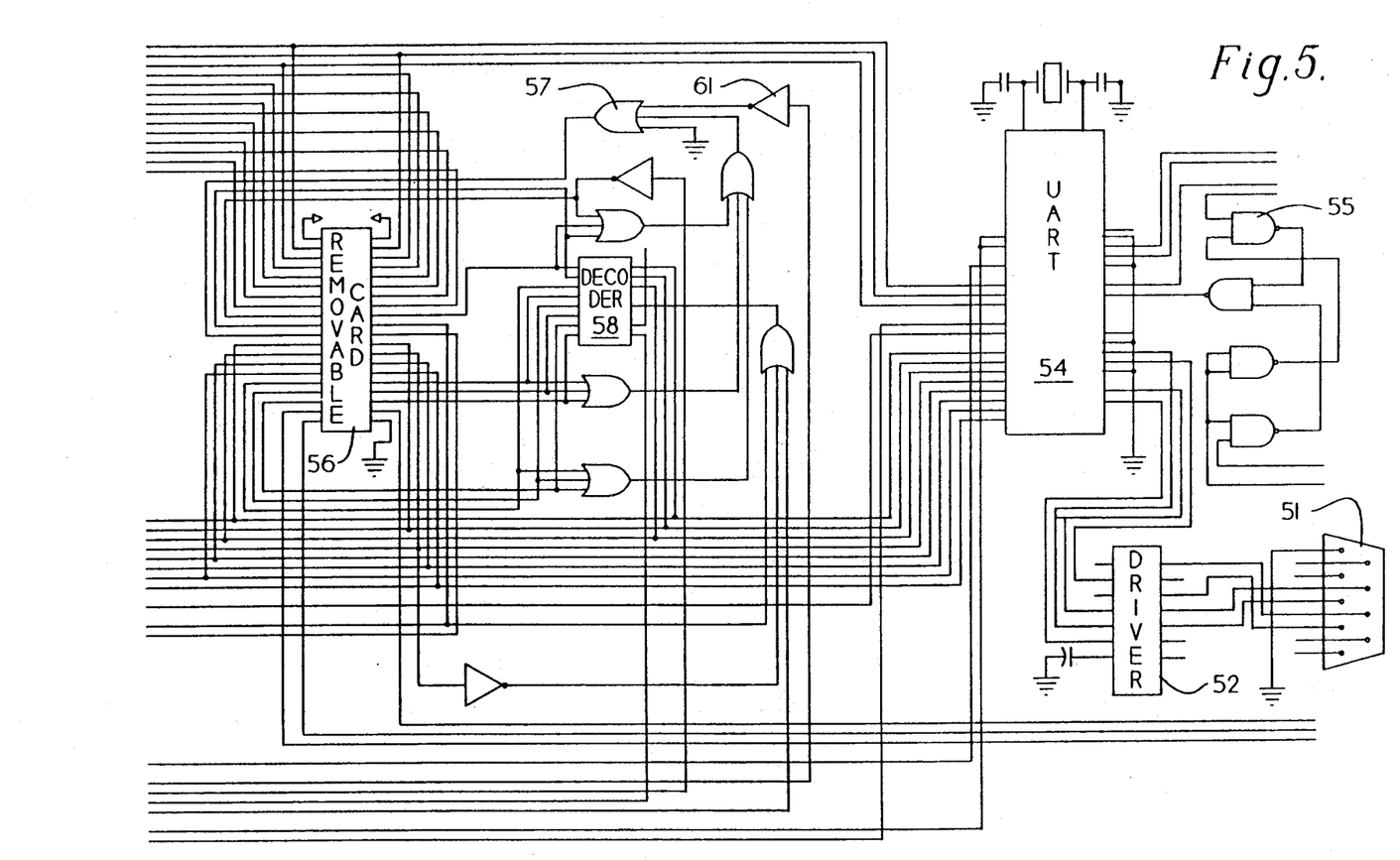
FIG. 5 is a detailed circuit diagram of the removable card having a memory and remote computer data entry portion of the circuit of the embodiment of FIG. 3.
Figure 7:
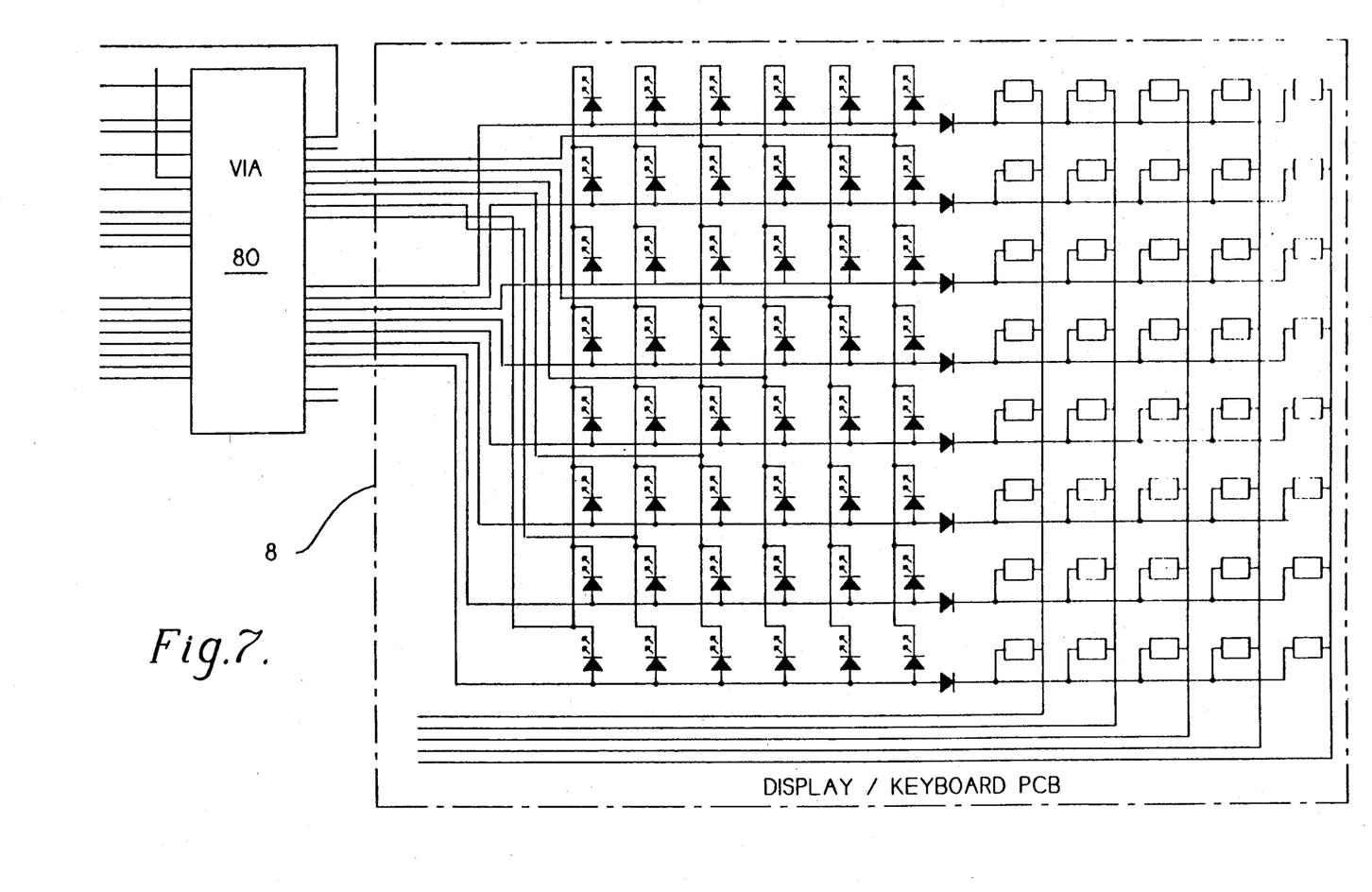
FIG. 7 is a detailed circuit diagram of the keyboard portion of the circuit of the embodiment of FIG. 3.
Figure 8:
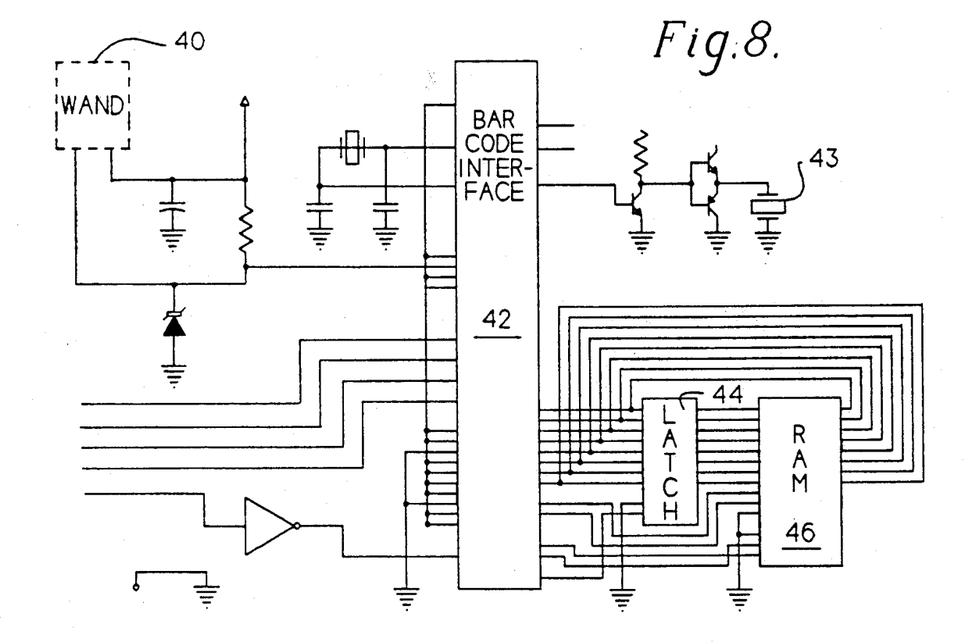
FIG. 8 is a detailed circuit diagram of the bar code reader interface portion of the circuit of FIG. 3.
Figure 9:
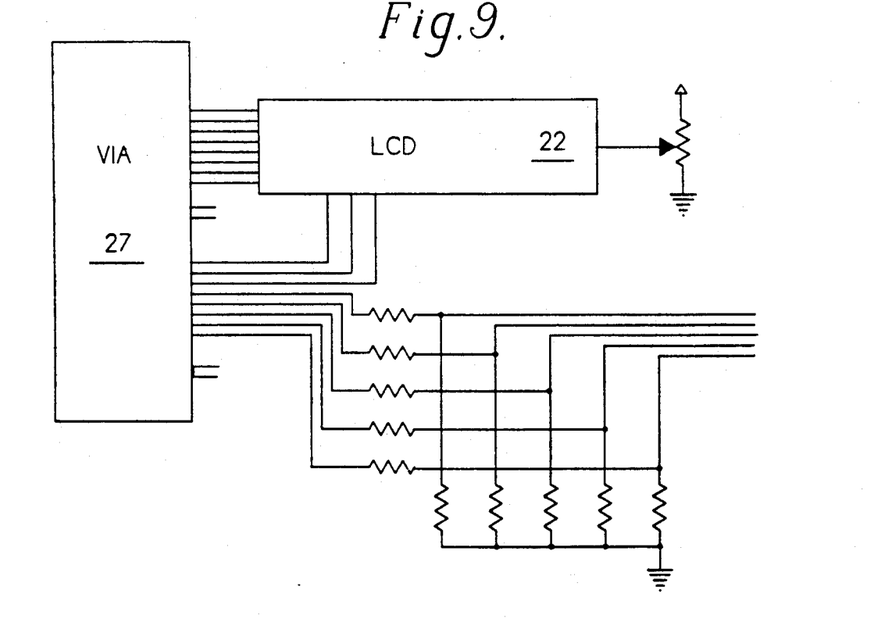
FIG. 9 is a detailed circuit diagram of the liquid crystal display portion of the circuit of the embodiment of FIG. 3.

Referring to FIGS. 3 and 7 the keyboard 8 is connected through a versatile interface adaptor (VIA) 80 to central processing unit 60 shown in FIG. 4. A second VIA 27 connects liquid crystal display 22 to the processing unit 60. A 32K erasable programmable memory 62, two 16K ROM's 63 and 32K static RAM 64, form the base memory for the system. We prefer to provide a clock 66 connected to the CPU and memories. CPU 60 is connected to a power source through inverter gates 61. Decoders 67 and 68 with gates 69 provide decoding for the CPU and As shown in FIG. 5, we prefer to provide a removable card 56 having a memory which may contain a program having instruction applicable to particular rotating machinery with associated gates 57, inverter gates 61 and decoder 58. This enables us to provide preselected programs for each calculator so that our system is tailored to particular uses and equipment specified by the customer. These programs may have anything from specific technical applications to notes from the supervisor that appear in display 22. Additionally, we provide an RS232 port 51 with associated decoder 52, UART 54 and gates 55. This enables the user to connect the unit to a remote computer 50 shown by a chain line block in FIG. 3. Then the user can transmit data for storage or analysis or receive data such as instructions to the user.

Figure 6:
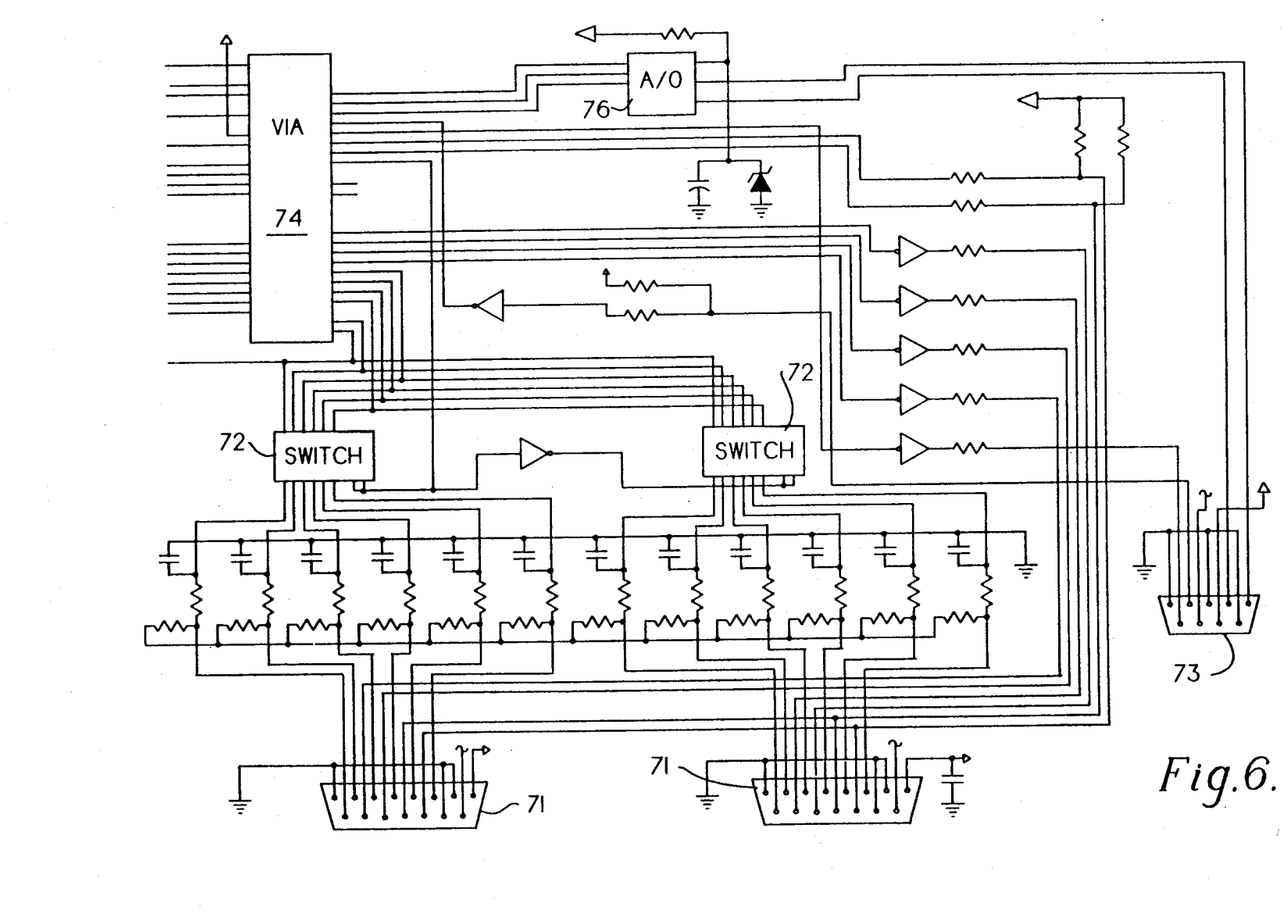
FIG. 6 is a detailed circuit diagram of the electronic indicator data entry portion of the circuit of the embodiment of FIG. 3.

Referring to FIGS. 3 and 6, we enable data to be entered in our system electronically from dial indicators through ports 71 or from a temperature probe 75 or other analog device through port 73. Data coming in through port 73 passes through analog digital converter 76 to VIA 74 and then on to the CPU and memory for storage or processing. Presently, there are three types of electronic dial indicators. To enable our system to be used for all three types of such indicators, we provide a switch 72 for each input port. This switch and associated circuit between dial indicator port 71 allows our system to recognize the type of electronic indicator which has been indicated and then allow data to flow from that indicator into our system. We may also receive data from a bar code reader wand 40 indicated by a chainline box in FIG. 3. So that the signal from the bar code reader is useful to our system we provide the interface circuitry of FIG. 8. That circuit includes a bar code interface unit 42 with associated latch 44 and memory 46. This portion of the circuit processes the information which comes in from the wand 40 and then transmits the data to the processing unit and memory. We prefer to also connect to the bar code interface a buzzer or piezo sounder 43 which tells the user that the system has received the information from the bar code over which the wand has been passed.

While we have shown and described a present preferred embodiment of the invention, it is to be distinctly understood that the invention is not limited thereto but may be variously practiced within the scope of the following claims.

We claim:

1. A diagnostic system for evaluating rotating machinery of the type wherein two machines have rotating shafts coupled to each other, the diagnostic system being able to be customized for particular rotating machinery comprising
    a. a keypad having numerical keys and function keys for selecting programs and responding to messages;
    b. a display of sufficient size to display messages and numbers;
    c. a face plate to which the keyboard and display are attached having thereon at least one illustration of two machines having interconnected shafts;
    d. a plurality of indicators attached to the face plate at various positions around the illustration to indicate points where measurements must be taken and adjustments be made in the machines in a sequence compatible with a program;
    e. a first memory storing at least one program and having a means of receiving and storing input from the keyboard and external sources;
    f. an application specific removable card containing a memory having a program which contains instructions applicable to particular rotating machinery said program for receiving and processing information about the particular rotating machinery entered by a user;
    g. a processing unit connected to the keyboard, display, indicators, first memory and application specific removable card for receiving data, performing calculations and other operations according to at least one program in at least one of the first memory and the application specific removable card and transmitting a result to at least one of the display, the first memory, the application specific removable card and an external receiver;
    h. a decoding unit connected to the processing unit, display, indicators, first memory and application specific removable card for receiving signals from the processing unit to actuate the indicators and the first memory; and
    i. means for receiving data from at least one of electronic measurement devices, optical sensors, temperature probe, modem, bar code reader, external memory and external computer connected to at least one of the processing unit, first memory and application specific removable card.

2. The diagnostic system of claim 1 also comprising an internal clock connected to at least one of the first memory, application specific removable card and processing unit for automatically recording a time and date for data entered into the system, wherein time and date can be transferred with the data to an external computer.

3. The diagnostic system of claim 1 also comprising a bar code interface connected to the processing unit and having a latch and memory connected thereto.

4. The diagnostic system of claim 3 also comprising a bar code reader connected to the bar code interface.

5. The diagnostic system of claim 1 also comprising a temperature probe terminal, and A/D converter connected to the terminal and an interface connected between the A/D converter and the processing unit.

6. The diagnostic system of claim 5 wherein the interface is a versatile interface adaptor.

7. The diagnostic system of claim 5 also comprising a temperature probe.

8. The diagnostic system of claim 1 also comprising a computer connection port, a driver connected to the port, and a UART connected to the driver and at least one of the processing unit, application specific removable card and the first memory.

9. The diagnostic system of claim 1 also comprising an electronic indicator port, an electronic switch connected to the port and compatible with the electronic indicator, and an interface connected to the electronic switch and the processing unit.

10. The diagnostic system of claim 1 wherein the application specific removable card contains a database of measurements taken on selected machines.

11. The diagnostic system of claim 1 wherein the application specific removable card contains a program which causes the system to retain selected measurements entered by the user.

12. The diagnostic system of claim 1 wherein at least one of the first memory and the application specific removable card have a program which disables selected keys at certain predetermined times during a data energy sequence.

13. The diagnostic system of claim 1 wherein at least one of the first memory and the application specific removable card contains a program which allows the user to create and store therein messages that the user wants to display on the display.

14. The diagnostic system of claim 1 wherein the display is an LCD display.

* * * * *

UNITED STATES PATENT AND TRADEMARK OFFICE
CERTIFICATE OF CORRECTION

PATENT NO. : 5,115,406

DATED : May 19, 1992

INVENTOR(S) : JOHN M. ZATEZALO, MICHAEL S. PANSON

It is certified that error appears in the above-identified patent and that said Letters Patent is hereby corrected as shown below:

Column 3, line 66, change "4" to --24--.

Column 7, line 38, after "and" insert --memories.--

Signed and Sealed this

Fifth Day of October, 1993

Attest:

*Attesting Officer*

BRUCE LEHMAN

*Commissioner of Patents and Trademarks*